United States Patent
Bilik et al.

(10) Patent No.: US 10,393,871 B2
(45) Date of Patent: Aug. 27, 2019

(54) METHOD FOR COMPUTATIONALLY SIMPLE RANGE-DOPPLER-ANGLE TRACKING USING GOERZEL FILTER

(71) Applicant: GM GLOBAL TECHNOLOGY OPERATIONS LLC, Detroit, MI (US)

(72) Inventors: Igal Bilik, Rehovot (IL); Moshe Laifenfeld, Haifa (IL); Alexander Pokrass, Bat Yam (IL)

(73) Assignee: GM GLOBAL TECHNOLOGIES OPERATIONS LLC, Detroit, MI (US)

( * ) Notice: Subject to any disclaimer, the term of this patent is extended or adjusted under 35 U.S.C. 154(b) by 363 days.

(21) Appl. No.: 15/374,222

(22) Filed: Dec. 9, 2016

(65) Prior Publication Data

US 2018/0164423 A1    Jun. 14, 2018

(51) Int. Cl.
| | | |
|---|---|---|
| *G01S 13/66* | (2006.01) | |
| *G01S 13/72* | (2006.01) | |
| *G01S 13/93* | (2006.01) | |
| *G01S 13/34* | (2006.01) | |
| *G01S 13/58* | (2006.01) | |
| G01S 7/35 | (2006.01) | |
| G01S 7/288 | (2006.01) | |

(52) U.S. Cl.
CPC ............ *G01S 13/66* (2013.01); *G01S 13/343* (2013.01); *G01S 13/584* (2013.01); *G01S 13/723* (2013.01); *G01S 13/931* (2013.01); G01S 2007/2883 (2013.01); G01S 2007/356 (2013.01)

(58) Field of Classification Search
CPC .... G01S 13/584; G01S 13/343; G01S 13/931; G01S 2007/356; G01S 2007/2883; G01S 13/66–726; G01S 13/723
See application file for complete search history.

(56) References Cited

U.S. PATENT DOCUMENTS

2012/0056779 A1* 3/2012 Freking ................. G01S 7/5273
342/189

FOREIGN PATENT DOCUMENTS

JP          2003-90880      *   3/2003

* cited by examiner

*Primary Examiner* — Matthew M Barker
(74) *Attorney, Agent, or Firm* — Cantor Colburn LLP

(57) ABSTRACT

A radar system and method of determining a tracking parameter for a target in a radar system is disclosed. A transmitter transmits a source signal at a target and a receiver receives an echo signal from the target corresponding to the source signal. A processor provides a discrete frequency spectrum for the echo signal, shifts the discrete frequency spectrum in frequency space by a selected amount to obtain a shifted spectrum, filters the shifted spectrum using a filter that is shifted in frequency space a same amount as the shifted spectrum, and determines a tracking parameter of the target from a central frequency of the frequency space at which an intensity of the shifted and filtered spectrum is a peak intensity.

18 Claims, 6 Drawing Sheets

METHOD FOR COMPUTATIONALLY SIMPLE RANGE-DOPPLER-ANGLE TRACKING USING GOERZEL FILTER

FIELD OF THE INVENTION

The subject invention relates to a method of tracking an object using a radar system and, in particular, to a system and method for aligning frequencies of echo signals, obtained from the object, at the radar system with central frequencies of frequency bins in order to improve frequency resolution and to improve the ability to track the object.

BACKGROUND

Recent automobiles and vehicles have been built with on-board safety systems which include radar systems for detecting a location or relative velocity of an object or target with respect to the vehicle so that a driver or a collision-avoidance device can react accordingly. A radar system includes a transmitter for sending out a source signal and a receiver for receiving an echo signal or reflection of the source signal from the target. The received signal is sampled at a selected sampling frequency and the sampled data points of the received signal are entered into a Fast Fourier Transform (FFT) in order to determine a frequency of the returning signal. A range or relative velocity of the target with respect to the vehicle can be determined from this frequency.

Due to the discrete nature of the FFT, the frequency spectrum resulting from the FFT displays high sidelobes and frequency smearing whenever the frequency of the echo signal is not the same as a central frequency of a frequency bin. These aberrations reduce the ability of the radar system to determine the frequency of the echo signal and thus to determine a location or relative velocity of the object. While increasing the length of the FFT increases the frequency resolution, such methods require additional hardware and longer computation times. Accordingly, it is desirable to provide a method for quickly and efficiently determining the frequency of the echo signal within a selected resolution.

SUMMARY OF THE INVENTION

In one exemplary embodiment of the invention, a method of determining a tracking parameter for a target in a radar system is disclosed. The method includes providing a discrete frequency spectrum for an input signal obtained at the radar system from reflection of a source signal from the target; shifting the discrete frequency spectrum in frequency space by a selected amount to obtain a shifted spectrum; filtering the shifted spectrum using a filter that is shifted in frequency space a same amount as the shifted spectrum; and determining the tracking parameter from a central frequency of the frequency spectrum at which an intensity of the shifted and filtered spectrum is a peak intensity.

In another exemplary embodiment of the invention, a radar system is disclosed. The radar system includes a transmitter for transmitting a source signal at a target; a receiver for receiving an echo signal from the target corresponding to the source signal; and a processor The processor is configured to provide a discrete frequency spectrum for the echo signal, shift the discrete frequency spectrum in frequency space by a selected amount to obtain a shifted spectrum, filter the shifted spectrum using a filter that is shifted in frequency space a same amount as the shifted spectrum, and determine a tracking parameter of the target from a central frequency of the frequency space at which an intensity of the shifted and filtered spectrum is a peak intensity.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
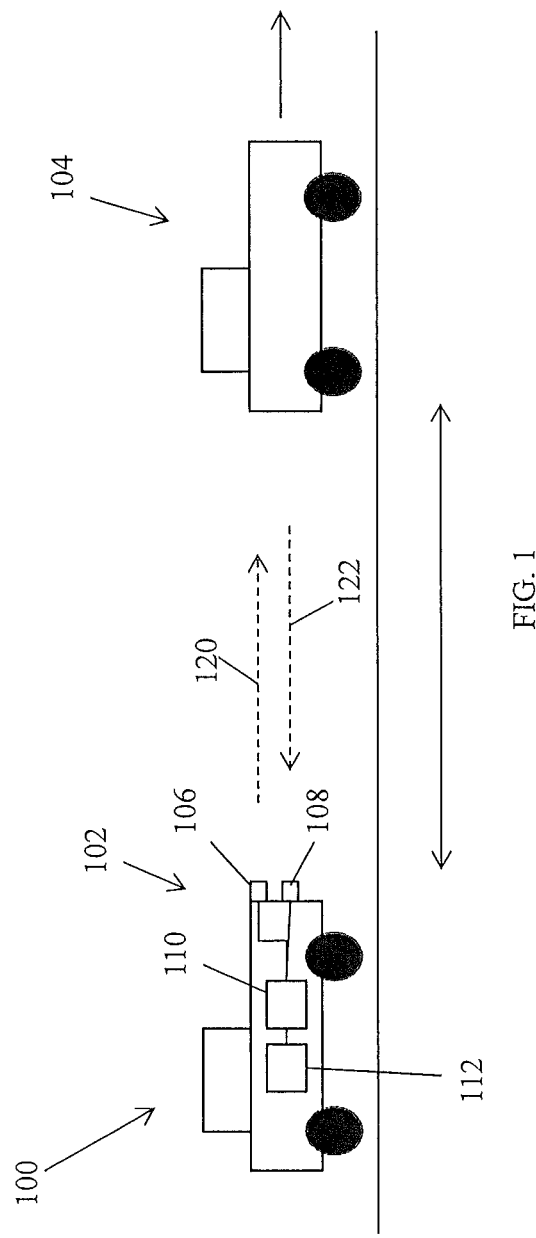
FIG. 1 shows a vehicle, such as an automobile, that includes a radar system suitable for determining a tracking parameter for an object or target with respect to the vehicle.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention, FIG. 1 shows a vehicle 100, such as an automobile, that includes a radar system 102 suitable for determining a tracking parameter for an object or target 104 with respect to the vehicle 100. The tracking parameter can include one or more of distance or range of the target 104, an azimuth angle of the target 104, an elevation of the target 104 and/or a relative velocity of target 104. In the embodiment shown in FIG. 1, the radar system 102 includes a transmitter 106 and a receiver 108. In alternate embodiments, the radar system 102 may be a MIMO (multi-input, multi-output) radar system that includes an array of transmitters and an array of receivers. A control unit 110 on-board the vehicle 100 controls and operates the transmitter 106 to generate a radio frequency wave (a "source signal" 120). In one embodiment, the source signal 120 includes a linear frequency-modulated continuous wave (LFM-CW), often referred to as a chirp signal. Alternately, the source signal 120 can be a pulsed signal or a combination of pulsed and chirp signals. A reflection of the source signal 120 from the target 104 is referred to herein as an echo signal 122. The echo signal 122 is received at the receiver 108, which generally includes circuitry for sampling the echo signal 122. The control unit 110 performs calculations on the echo signal 122 in order to determine the tracking parameter of the target 104. Knowledge of the tracking parameter of the target 104 can then be used to maneuver the vehicle 100 by, for example, accelerating or decelerating the vehicle 100 or steering the vehicle in order to avoid the target 104. In one embodiment, the control unit 110 determines the tracking parameter and cooperates with a collision-avoidance system 112 to control steering and acceleration/deceleration components to perform necessary maneuvers at the vehicle 100 to avoid the target 104. In another embodiment, the control unit 110 provides a signal to alert a driver of the vehicle 100 so that the driver can take any necessary action to avoid the target 104.

The control unit 110 includes a processor for performing various methods disclosed herein for determining the tracking parameter and operating the vehicle 100 according to the tracking parameter. The control unit 110 further includes a memory for storing programs that, when accessed by the processor, enables the processor to perform the various methods disclosed herein. The memory can further store various data such as source signal waveforms, echo signals, frequency spectra, etc.

While the radar system 102 is discussed herein as being on-board vehicle 100, the radar system 102 may also be part of an immobile or stationary object in alternate embodiments. Similarly, the target 104 can be a vehicle or moving object or can be an immobile or stationary object.

Figure 2:
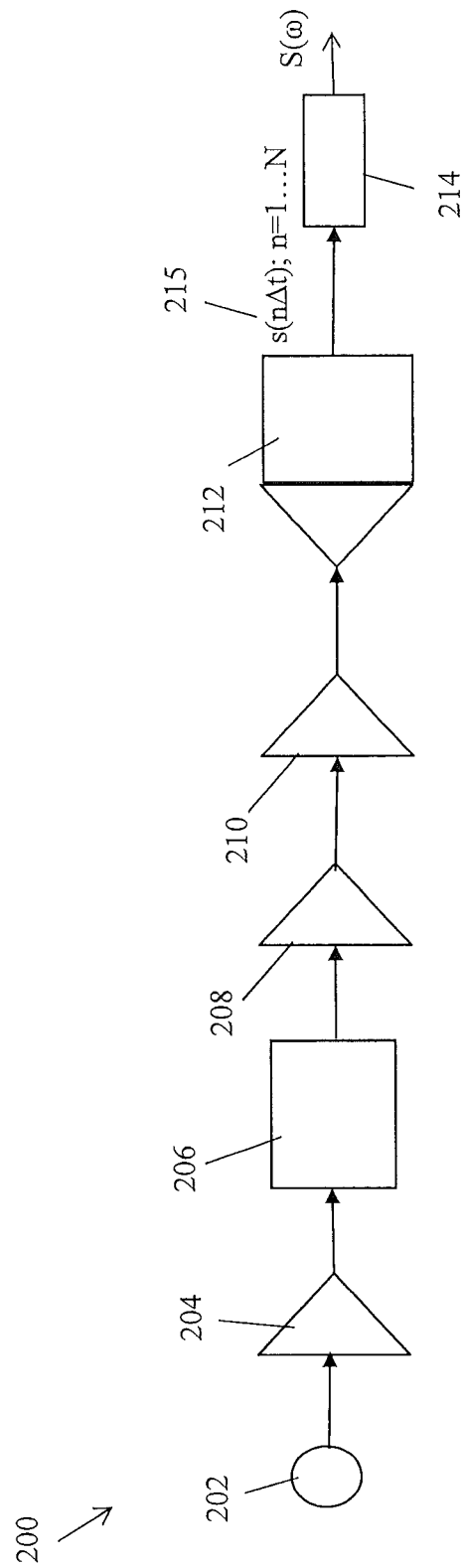
FIG. 2 shows an exemplary front end of a receiver system for the exemplary radar system of FIG. 1.

FIG. 2 shows an exemplary front end 200 of a receiver system for the exemplary radar system of FIG. 1. The front end 200 includes a receiver antenna 202 that receives the echo signal 122 of FIG. 1. An electrical signal generated by the echo signal 122 is sent from the receiver antenna 202 through a low noise amplifier 204 that amplifies signals without significantly degrading a signal-to-noise ratio (SNR). The amplified signal is sent to a mixer 206. The mixer 206 combines both in-phase and quadrature components of the echo signal 122. The combined signal undergoes filtering via a high-pass filter 208 and a low-pass filter 210. Analog-to-digital converter (ADC) 212 converts the filtered signal to a digital signal 215 (s(nΔt)) by sampling the filtered signal at a selected sampling frequency, $f_s$. The digital signal 215 is provided to a digital signal processor (DSP) 214, which performs the various methods disclosed below for determining the tracking parameter. The DSP 214 generates a discrete frequency spectrum S(ω) of the digital signal 215. In one embodiment, the DSP 214 performs a Fast Fourier Transform (FFT) on the digital signal 215 to obtain the discrete frequency spectrum S(ω). Peaks within the discrete frequency spectrum S(ω) are representative of the echo signal and are used to determine the tracking parameter of the target 104. Other transforms besides FFT can be used in alternate embodiments.

The FFT performed on the digital signal 215 produces a discrete frequency space which includes multiple frequency bins for representing a frequency component of the digital signal 215. The length of the FFT is related to the number of samples. Therefore, N samples of the echo signal at the ADC 212 indicate an FFT of length N. The resultant frequency space has N frequency bins, each characterized by a central frequency. A bin resolution ΔF of the frequency space provided by the FFT is therefore given by $\Delta F = f_s/N$, where $f_s$ is the sampling rate.

Figure 3:
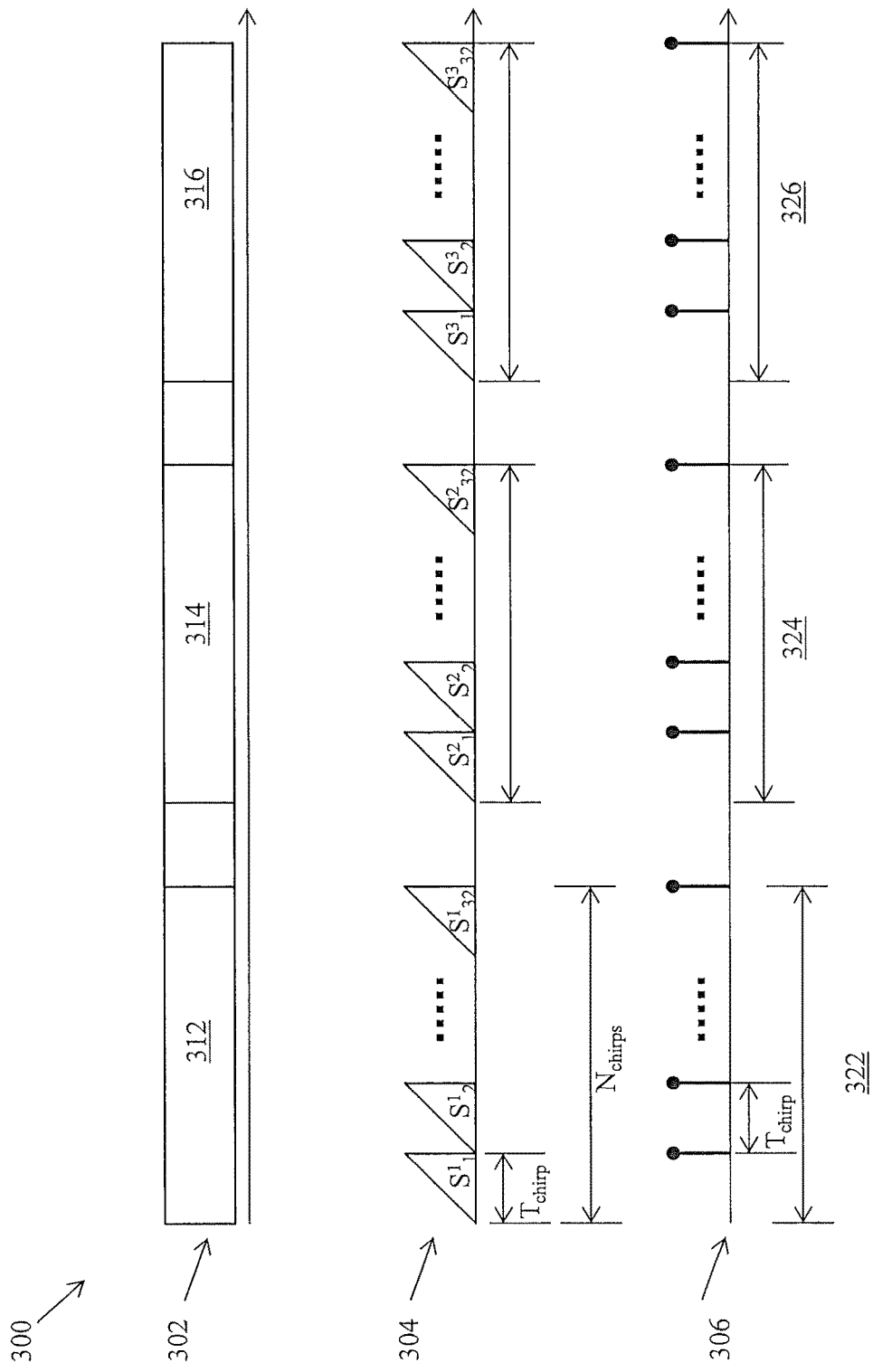
FIG. 3 shows a time diagram illustrating transmission signals and echo signals obtained by operation of radar system in accordance with one embodiment of the invention.

FIG. 3 shows a time diagram 300 illustrating transmission signals and echo signals obtained by operation of radar system 102 in accordance with one embodiment of the invention. The top row 302 shows a sequence of transmission frames (first transmission frame 312, second transmission frame 314 and third transmission frame 316) separated by down-time periods or pauses. While three transmission frames are shown for illustrative purposes, any number of transmission frames may be included in a signal transmission.

Each of the transmission frames 312, 314 and 316 includes a plurality of chirp signals. The second row 304 shows chirp signals of the transmission frames 312, 314 and 316 in one embodiment of the invention. First transmission frame 312 includes 32 chirp signals (labelled $S^1_1$ through $S^1_{32}$). Second transmission frame 314 includes 32 chirp signals (labelled $S^2_1$ through $S^2_{32}$) and third transmission frame 316 includes 32 chirp signals (labelled $S^3_1$ through $S^3_{32}$). While 32 chirp signals are shown within each transmission frame for illustrative purposes, any number of chirp signals (that are powers of 2) may occur within a transmission frame. In general, each transmission frame has a same number of chirp signals. Each chirp signal lasts for a time duration indicated by $T_{Chirp}$, and chirp signals within a transmission frame follow each other substantially without a pause.

The bottom row 306 shows sampled signals generated as a result of the reflection of the chirp signals of the second row 304 from a target, such as target 104 of FIG. 1. Three sample frames 322, 324 and 326 are shown corresponding to the transmission frames 312, 314 and 316 respectively. Sample frames 322, 324 and 326 include sampled signals. Each sampled signal in bottom row 306 is created in response to a corresponding chirp signal in second row 304. Within a sample frame, sample signals are separated in time by the duration of the chirp signal, $T_{Chirp}$).

Figure 4:
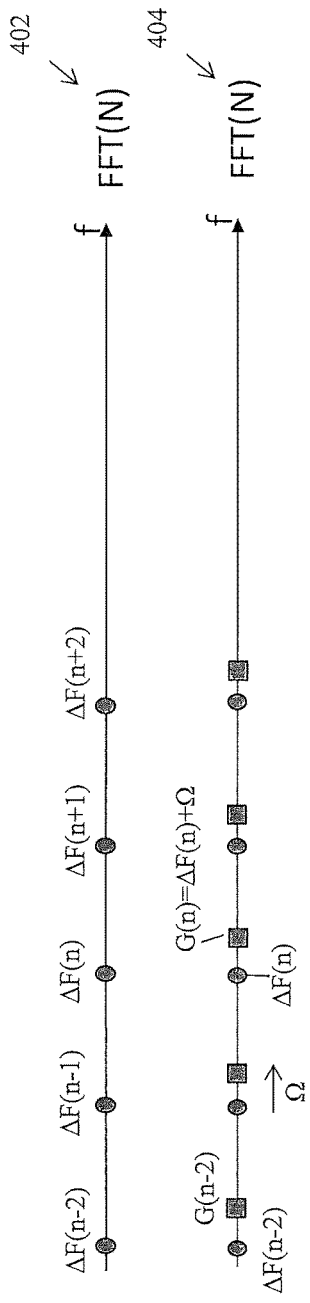
FIG. 4 shows two frequency spaces illustrating frequency resolution difficulties that occur when performing a Fast Fourier Transform on a signal whose frequency does not correspond to the sampling frequency.

FIG. 4 shows two frequency spaces illustrating frequency resolution difficulties that occur when performing an FFT on a signal whose frequency does not correspond to the sampling frequency. The first frequency space 402 shows, via circles, the locations of central frequencies of illustrative frequency bins {ΔF(n−2), ΔF(n−1), ΔF(n), ΔF(n+1), ΔF(n+2)}. A frequency signal that falls within a frequency bin is indicated in frequency space 402 by a peak at the central frequency of the frequency bin. When a frequency of a sampled signal falls exactly at the center of the frequency bin, then the frequency space accurately represents the frequency of the sampled signal. However, this is not usually the case.

The second frequency space 404 shows, via squares, how sampled signal frequencies are more likely to be located with respect to the frequency bins {ΔF(n−2), ΔF(n−1), ΔF(n), ΔF(n+1), ΔF(n+2)}. Rather than producing peaks at a central frequency of the frequency bins, the frequency peaks of the actual echo signal are located at squares {G(n−2), G(n−1), G(n), G(n+1), G(n+2)}. The difference between the location of the frequency peak of the actual echo signal and the central frequency of the frequency bins is represented by frequency Ω. Due to the nature of the discrete frequency space, the FFT returns a frequency ΔF(n) for the echo signal which is different than the actual frequency G(n) of the echo signal, where G(n)=ΔF(n)+Ω.

Figure 5:
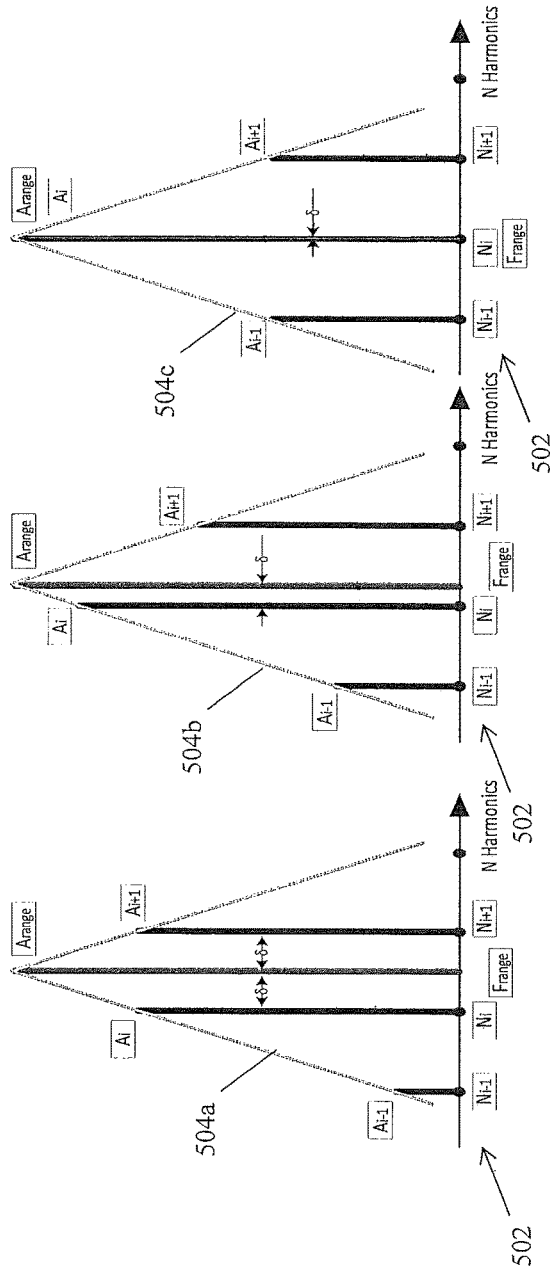
FIG. 5 illustrates a method for determining a frequency of the echo signal for echo signal frequencies that do not match a central frequency of a frequency bin by shifting the spectrum to align spectral peaks with central frequencies, according to an embodiment of the invention.

FIG. 5 illustrates a method for determining a frequency of the echo signal for echo signal frequencies that do not match a central frequency of a frequency bin by shifting the spectrum to align spectral peaks with central frequencies, according to an embodiment of the invention. Frequency spaces 502a, 502b, 502c show a same frequency space. Frequency spectra 504a, 504b, 504c are the same frequency spectrum at different locations in their respective corresponding frequency spaces 502a, 502b, 502c. The frequency spaces 502a, 502b and 503c include frequency bins having central frequencies { ... $N_{i-1}, N_i, N_{i+1}$ ... }. Frequency space 502a includes a frequency spectrum 504a at an initial location. The frequency spectrum 504a can be a frequency spectrum resulting from an FFT being performed on a frame of sampled signals, for example. Peak frequency $F_{range}$ of the frequency spectrum 504a is located between central frequency $N_i$ and central frequency $N_{i+1}$. The result of this misalignment of peak frequency $F_{range}$ with either of the central frequencies produces a broad frequency spectrum 504a and high side lobes (not shown). In frequency space 504a, the peak $A_{range}$ is located at a frequency $F_{range}$ that is evenly between $N_i$ and $N_{i+1}$. As a result the intensity $A_i$ of frequency spectrum 504a at frequency $N_i$ is about the same as the intensity $A_{i+1}$, of frequency spectrum 504a at frequency $N_{i+1}$. A frequency difference δ is shown between $F_{range}$ and $N_i$ and between $F_{range}$ and $N_{i+1}$.

In frequency space 502b, the frequency spectrum 504b has been shifted from its original position in frequency space 502a to new location in which $F_{range}$ is closer to central frequency $N_i$. The intensity $A_i$ of frequency spectrum 504b at frequency $N_i$ is greater than the intensity $A_{i+1}$, of frequency spectrum 504b at frequency $N_{i+1}$, indicating that the frequency $F_{range}$ is closer to frequency $N_i$ than it is to frequency $N_{i+1}$.

In frequency space 502c, the frequency spectrum 504c has been shifted so that the peak frequency $F_{range}$ coincides with a central frequency $N_i$. Aligning the peak frequency $F_{range}$ with the central frequency $N_i$ reduces spreading of the frequency spectrum 504c and the presence of high side lobes. Therefore, the central frequency $N_i$ can be used to determine the frequency of the echo signal related to frequency spectrum 502a. Central frequency Ni now exhibits the highest peak intensity from among all central frequencies { ... $N_{i-1}, N_i, N_{i+1}$ ... }. In one embodiment, the frequency of the echo signal is determined from the central frequency $N_i$ and a shifting frequency which indicates an amount by which the frequency spectrum is shifted from its initial position in order for the peak of the frequency spectrum to align with a central frequency. The location of central peak $N_i$, as well as the amount by which the spectrum has been shifted, can then be selected for subsequent computations to determine a tracking parameter of the target.

Figure 6:
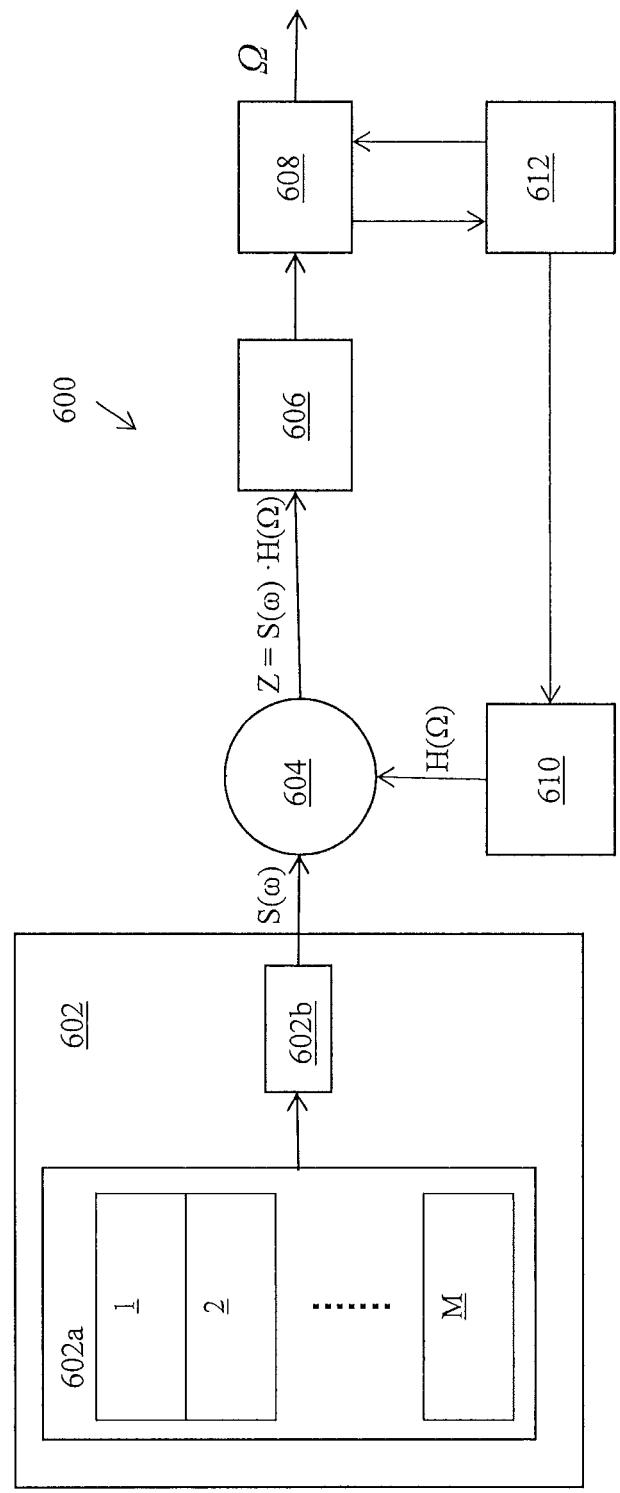
FIG. 6 shows a schematic diagram of a method for shifting a frequency spectrum in frequency space as shown in FIG. 5 in order to obtain a high resolution for the frequency spectrum.

FIG. 6 shows a schematic diagram 600 of a method for shifting a frequency spectrum in frequency space as shown in FIG. 5 in order to obtain a high resolution for the frequency spectrum. Spectral memory 602 includes a memory 602a and FFT module 602b for producing spectra. Memory 602a includes a plurality of frames of (1 Frame, 2 Frame, 3 Frame, ... , M Frame), each frame includes signal samples, such as the sample frames in row 306 of FIG. 3. An FFT 602a operates on each sample frame to produce a frequency space S(ω). Alternatively, the memory 602 can store a plurality of frequency spaces S(ω).

The memory 602 therefore provides a frequency spectrum S(ω) to a multiplier 604. To shift the frequency spectrum S(ω), the multiplier 604 multiplies the frequency spectrum S(ω) by a harmonic signal $H(\Omega)=\exp(j2\pi\Omega T_{chirp})$ provided by a harmonic signal generator 610 to obtain shifted spectrum Z=S(ω)·H(Ω). The frequency Ω of the harmonic signal is a variable parameter that shifts the frequency spectrum S(ω) in frequency space as illustrated in FIG. 4 and FIG. 5. Filter 606 is applied to the shifted frequency spectrum Z in order to remove side lobes outside of the central peak of the frequency spectrum.

The filter 606 is applied to the shifted frequency spectrum prior to detecting the peak of the frequency spectrum at the peak detector 608. The filter 606 is a baseband filter that can be shifted in frequency space. In one embodiment, the filter 606 is shifted in frequency space by the same amount as the frequency spectrum. Thus, the center of the filter 606 maintains its position with respect to a peak of the frequency spectrum. In one embodiment, the filter 606 is a Goertzel filter. The Goertzel filter $F_G$ is described by $F_G=N_i(1/T_{chirp})/N_{FFT}$, wherein $N_{FFT}$ is a length of the FFT, $T_{chirp}$ is a duration of the chirp signal and $N_i$ is the central frequency of the $i^{th}$ frequency bin. The characteristic of the filter is therefore related to the frequency $N_i$ at which the filter is applied. The filter 606 suppresses one or more side lobes of the frequency spectrum to leave the main lobe of the frequency spectrum.

The peak detector 608 determines intensities for frequency bins for the shifted and filtered frequency spectrum and then determines which frequency bin has the greatest intensity. The peak detector 608 estimates the intensities of the spectrum for each frequency bin and determines which frequency bin has the peak intensity. This determination of peak intensity can indicate whether or not the frequency spectrum S(ω) is aligned with a central frequency. The peak detector 608 can communicate with a frequency control module 612 to change the frequency Ω of the harmonic signal to a new frequency when a peak intensity is not sufficiently determined. A subsequent spectrum can then be shifted by the harmonic signal characterized by the new frequency and the process of filtering and peak detection can be repeated. After a selected number of such iterations, the peak frequency of the frequency spectrum can be determined within a selected resolution.

Figure 7:
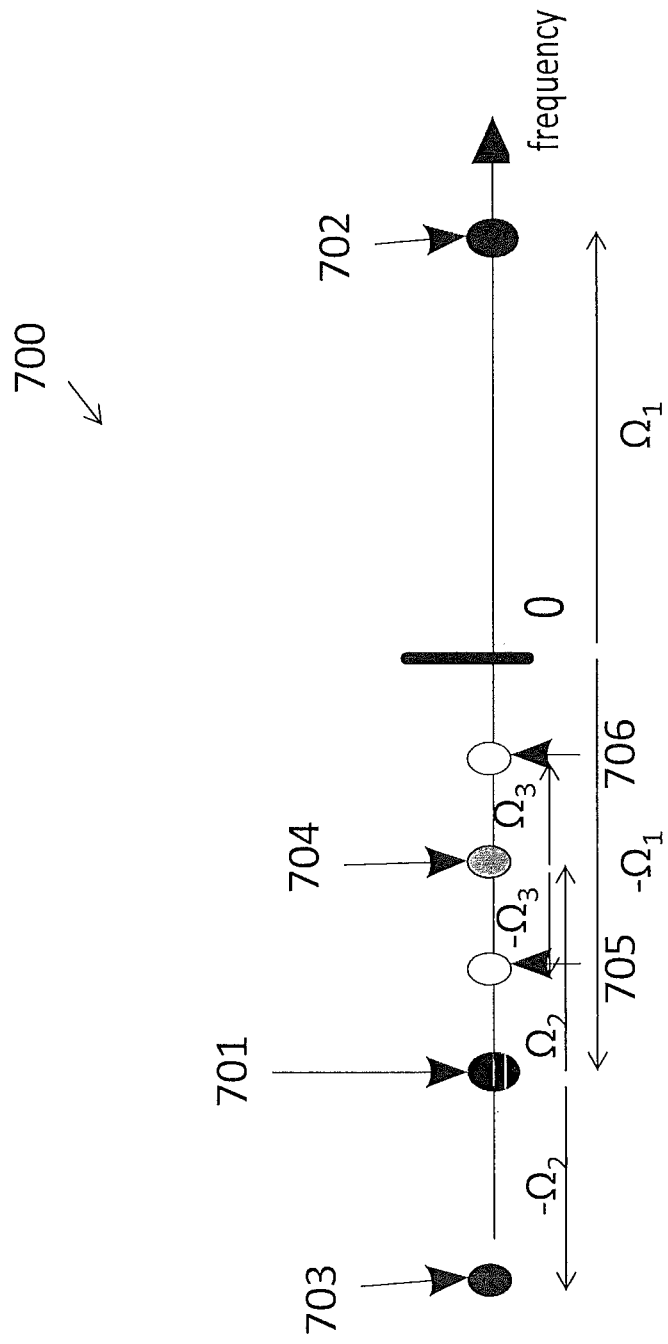
FIG. 7 shows a schematic diagram illustrating a method of centering a peak of the frequency spectrum at a central frequency of a frequency bin.

FIG. 7 shows a schematic diagram illustrating a method of centering a peak of the frequency spectrum at a central frequency of a frequency bin. The method computes peak frequency for a spectrum shifted to two separate frequency locations and accepts the frequency location at which the peak frequency is greater. This method is iterated, each time shifting the spectrum from its previously determined position by smaller and smaller amounts. Starting at an original frequency location, the frequency spectrum is shifted to first frequency location 701 and a peak intensity is determined at the first frequency location 701. The frequency spectrum is also shifted to second frequency location 702 and a peak intensity is determined at the second frequency location 702. The frequency shift ($\Omega_1$) from the original location to the first frequency location 701 is equal and opposite the frequency shift ($-\Omega_1$) from the original location to the second frequency location 702. The peak intensity at the first frequency location 701 is compared to the peak intensity at the second frequency location 702 in order to determine which peak is greater. In the illustrative diagram 700, the first frequency location 701 is selected as having the greater peak intensity.

In a second iteration, from the first frequency location 701, the frequency spectrum is shifted from its first frequency location 701 to a third frequency location 703 (by frequency $-\Omega_2$) and to a fourth frequency location 704 (by frequency $-\Omega_2$) and the greater of the two intensity peaks is determined. The amount by which the frequency spectrum is shifted for the second iteration is less than the amount by which the frequency spectrum is shifted for the first iteration, i.e., $|\Omega_2|<|\Omega_1|$. For illustrative purposes, the fourth frequency location 704 is selected as having the greater peak intensity. For the third iteration, the frequency spectrum is shifted to from the fourth frequency location 704 to a fifth frequency location 705 (by frequency $-\Omega_3$) and to a sixth frequency location 706 (by frequency $\Omega_3$). For each iteration, the amount by which the frequency spectrum is shifted is less than the amount by which the frequency spectrum is shifted in the previous iteration. Thus $|\Omega_{k+1}|<|\Omega_k|$. In one embodiment, the amount of shifting for a given iteration is half of the amount of shifting in the previous iteration. The iterations can be ended when the change in frequency resolution is within a selected tolerance.

The methods disclosed herein improve the ability of a radar system to track and react to a target. The filter disclosed herein can be utilized without significantly increasing a computation time and/or a hardware requirement. Therefore, the tracking parameter of the target can be provided to the driver or the collision avoidance system in an amount of time that allows the driver or collision avoidance system to be able to react to avoid the target, thus increasing a safety of the driver and vehicle.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method of determining a tracking parameter for a target in a radar system, comprising:
    providing a discrete frequency spectrum for an input signal obtained at the radar system from reflection of a source signal from the target;
    shifting the discrete frequency spectrum in frequency space by a selected amount to obtain a shifted spectrum;
    filtering the shifted spectrum using a filter that is shifted in frequency space a same amount as the shifted spectrum; and
    determining the tracking parameter from a central frequency of the frequency spectrum at which an intensity of the shifted and filtered spectrum is a peak intensity.

2. The method of claim 1, wherein the filter removes a side lobe from the shifted spectrum.

3. The method of claim 1, wherein the filter further comprises a Goertzel filter.

4. The method of claim 1, wherein shifting the spectrum further comprises multiplying the frequency spectrum by a harmonic signal characterized by a shifting frequency.

5. The method of claim 4, further comprising determining the tracking parameter from the central frequency and the shifting frequency.

6. The method of claim 1, further comprising shifting the frequency spectrum to a first frequency location and a second frequency location, determining a first peak intensity at the first frequency location and a second peak intensity at the second frequency location, and determining the greater of the first peak intensity and the second peak intensity to select one of the first frequency location and the second frequency location.

7. The method of claim 6, further comprising performing a plurality of frequency shifts, with each successive frequency shift being less than the previous frequency shift.

8. The method of claim 1, wherein providing a discrete frequency spectrum for the input signal further comprises performing a Fast Fourier Transform (FFT) on the input signal, wherein the central frequency is the central frequency of a frequency bin of the FFT.

9. The method of claim 1, further comprising performing an action at a vehicle with respect to the target based on the tracking parameter.

10. A radar system, comprising:
    a transmitter for transmitting a source signal at a target;
    a receiver for receiving an echo signal from the target corresponding to the source signal;
    a processor configured to:
    provide a discrete frequency spectrum for the echo signal;
    shift the discrete frequency spectrum in frequency space by a selected amount to obtain a shifted spectrum;
    filter the shifted spectrum using a filter that is shifted in frequency space a same amount as the shifted spectrum; and
    determine a tracking parameter of the target from a central frequency of the frequency space at which an intensity of the shifted and filtered spectrum is a peak intensity.

11. The radar system of claim 10, wherein the filter removes a side lobe from the shifted spectrum.

12. The radar system of claim 10, wherein the filter further comprises a Goertzel filter.

13. The radar system of claim 10, the processor is further configured to shift the spectrum by multiplying the frequency spectrum by a harmonic signal characterized by a shifting frequency.

14. The radar system of claim 13, wherein the processor is further configured to determine the tracking parameter from the central frequency and the shifting frequency.

15. The radar system of claim 13, wherein the processor further shifts the frequency spectrum to a first frequency location and a second frequency location, determines a first peak intensity at the first frequency location and a second peak intensity at the second frequency location, and determines the greater of the first peak intensity and the second peak intensity to select one of the first frequency location and the second frequency location.

16. The radar system of claim 15, wherein the processor performs a plurality of frequency shifts, with each successive frequency shift being less than the previous frequency shift.

17. The radar system of claim 10, wherein the processor provides the discrete frequency spectrum by performing a Fast Fourier Transform (FFT) on the echo signal, wherein the central frequency is the central frequency of a frequency bin of the FFT.

18. The radar system of claim 10, wherein the processor is further configured to perform an action at a vehicle with respect to the target based on the tracking parameter.

* * * * *